Sept. 8, 1925.

A. F. LA FON

ROD TENSIONING DEVICE

Original Filed Sept. 22, 1920

1,552,749

Alphonse Felix La Fon Inventor

Patented Sept. 8, 1925.

1,552,749

UNITED STATES PATENT OFFICE.

ALPHONSE FELIX LA FON, OF SEWAREN, NEW JERSEY.

ROD-TENSIONING DEVICE.

Application filed September 22, 1920, Serial No. 412,105. Renewed February 2, 1924.

*To all whom it may concern:*

Be it known that I, ALPHONSE FELIX LA FON, a citizen of the United States, and a resident of Sewaren, in the county of Middlesex and State of New Jersey, have invented an Improvement in Rod-Tensioning Devices, of which the following is a specification.

The present invention relates to an improvement in rod tensioning devices, one object being to provide an appliance which may be useful more particularly in tightening rod clamps such for example as are commonly used in concrete construction.

Figure 1:
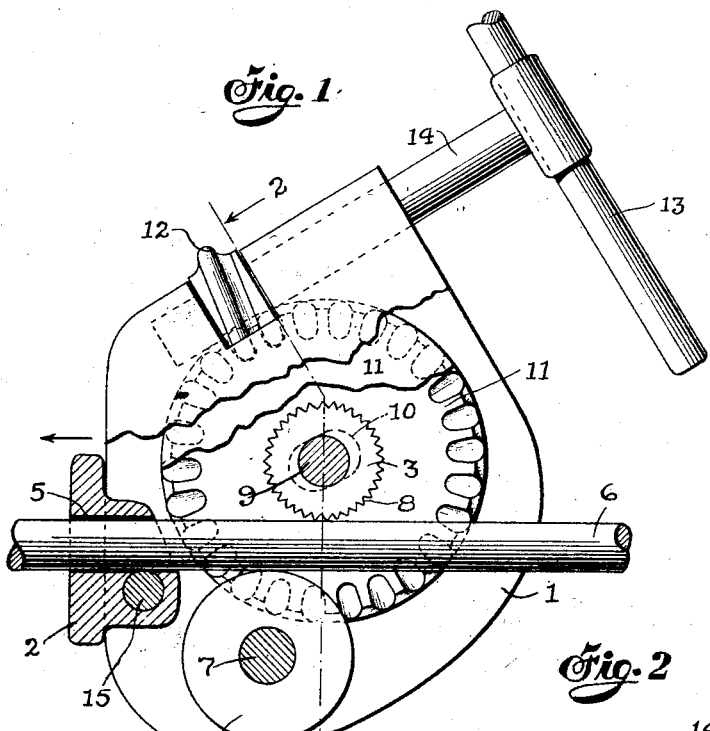
Figure 2:
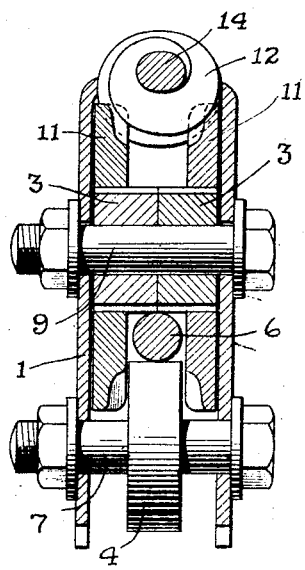

One embodiment of my invention is illustrated in the drawings accompanying the present specification, and in which Figure 1 is a view in elevation, some portion being broken away and other portions being shown in longitudinal vertical section, and Figure 2, a view in section on the line 2—2 of Figure 1.

The device illustrated in the drawings as an embodiment of my invention includes a housing 1, having means for supporting in operative relation a bearing block 2, a rod engaging tractor member 3, a thrust receiving roller 4, and means for actuating the tractor member.

The bearing block 2 is provided with a passageway 5 adapted to receive and guide the free end of a clamp rod 6. The thrust receiving roller 4 is rotatably mounted on a shaft 7 journaled in the housing 1 and positioned at one side of the rod 6 opposite the tractor member 3, said tractor member being provided with rod biting deformations at its peripheral surface such as teeth 8. The tractor member 3 is mounted to rotate on a shaft 9 journaled in slots 10 formed in the housing 1 and having their longitudinal axes inclined with respect to the longitudinal axis of the rod 6. The tractor member 3 may be actuated by means of gears 11 operatively positioned with respect to a worm 12 journaled in the housing 1 and adapted to be rotated manually by means of a handle 13 secured to the worm carrying shaft 14.

Where the tractor member 3 is provided with teeth such as 8, these teeth may extend across the entire width of said member and may engage similarly shaped interiorly arranged recesses in the gears 11. The tractor member 3 is also preferably made in two similar portions so that when the gears 11 and the members 3 are assembled with the worm 12, there may be sufficient relative movement of rotation between the two parts of said tractor member to permit effective engagement of the gears 11 with the thread of the worm 12.

In operation and as applied in the capacity of a rod clamp tightener in concrete construction, the bearing block 2 ordinarily bears against a rod clamp not shown but which is usually so assembled that, when the proper positioning of the members has been attained the clamp may be tightened to hold said members in the desired position. With the block positioned as described and the rod 6 passing through the opening 5 in said block and between the tractor member 3 and the roller 4, the operator will actuate the worm 12 to drive the tractor member 3 in the direction of the arrow, Figure 1. There will be relative movement between the tractor 3 and the rod 6 when the manual driving force is applied, but, whether the device moves or whether the rod moves will depend upon the character of the adjustment being made. Thus, if the device were being used to take up the slack in a cable, it is likely that the apparatus will remain fixed as to position while the cable would be moved through the opening 5. However, in applying the device to tightening rod clamps, it is likely that the position of the rod would remain fixed while the tractor would move along said rod only to the extent permitted by the yielding of the forms being clamped together.

In order that the device may be more readily attached to the end of the rod 6, the bearing block 2 may be pivotally mounted at 15. Furthermore, the space between the roller 4 and the tractor member 3 may be varied to permit passage of the free end of the rod 6. Thus, when the shaft 9 bears against the upper end of the slots 10 there will be a maximum space between the tractor 3 and the roller 4. However, when the operator actuates the worm 12, the shaft 9 will be forced toward the lower end of slot 10 and, the greater the resistance to relative movement between rod 6 and tractor member 3, the greater will be the thrust of shaft 9 toward its lowermost position with respect to the slots 10 and consequently a more secure gripping or biting of the teeth 8 into the metal of the rod 6.

Besides such advantages as will be obvious from the simplicity and ruggedness of the construction hereinabove described, it will also be noted that this construction provides means for automatically gaining and holding each increment of adjustment made by operation of the device. In other words, there will be no slip when the rod is under tension or the clamp members are under compression. Furthermore, the effort involved in actuating the devices operates in such a direction that the danger of side slipping or uneven pressure against the clamp or the forms is avoided.

What I claim is:

1. A rod clamp tightener comprising a housing, a bearing block adapted to embrace a clamp rod, a rotatable tractor member slidably mounted in said housing, a thrust receiving and rod engaging roller also mounted in the housing, and means for imparting a combined sliding and rotating movement to the tractor member.

2. A rod clamp tightener comprising a housing, a rod guiding bearing block, a tractor member journaled in the housing at one side of the path of the rod and slidable obliquely toward and away from said path, a roller journaled at the opposite side of said path, and means for moving the tractor toward said roller and for actuating the tractor.

3. A rod clamp tightener comprising a housing, a rod engaging tractor member, a rod engaging roller opposed thereto, means for actuating the tractor member, and a rod guiding and clamp pressing bearing member pivotally mounted on the housing to receive and guide the end of a clamp rod toward and between said tractor member and said roller.

4. A rod clamp tightener comprising a housing, a rod engaging tractor member, a rod engaging roller opposed thereto, and means for actuating the tractor member comprising a worm gear secured to the tractor, a worm journaled in the housing in operative relation to said worm gear, and a worm actuating shaft mounted in the housing and having its exposed or free end extending in a direction away from the path of the rod.

5. A rod clamp tightener comprising a housing, a rod engaging roller journaled therein, tractor means also journaled in the housing and comprising a pair of rod engaging members having irregular peripheral surfaces, said members being loosely mounted on a common shaft and independently rotatable thereon, and means for operatively rotating said members.

6. A rod clamp tightener comprising a housing, a rod engaging roller journaled therein, tractor means also journaled in the housing and comprising a pair of rod engaging members having irregular peripheral surfaces, said members being loosely mounted on a common shaft and independently rotatable thereon, and means for operatively rotating said members including a gear secured to each of the rod engaging members and co-operating to form a worm gear, and a worm journaled in the housing in operative driving relation to said worm gear.

7. A rod clamp tightener comprising a housing, a rod guiding bearing block, a tractor member journaled in the housing at one side of the path of the rod and slidable obliquely toward and away from said path, a roller journaled at the opposite side of said path, and means for moving the tractor toward said roller and for actuating the tractor, said means including a worm gear and a worm journaled in said housing and having its longitudinal axis disposed substantially parallel to the sliding direction of the tractor member.

8. A rod clamp tightener comprising, in combination, a housing, a thrust receiving roller rotatably mounted thereon, a tractor member mounted thereon, a guide member pivotally mounted thereon, and means to rotate said tractor member also mounted thereon.

In testimony whereof, I have signed my name to this specification this 21 day of September 1920.

ALPHONSE FELIX LA FON.